(12) United States Patent
Picaut et al.

(10) Patent No.: US 8,972,141 B2
(45) Date of Patent: Mar. 3, 2015

(54) METHOD AND SYSTEM FOR CONTROLLING AIRCRAFT BRAKING ON A RUNWAY

(71) Applicants: Airbus Operations (SAS), Toulouse (FR); Airbus (SA), Blagnac (FR)

(72) Inventors: Stephane Picaut, Toulouse (FR); Jerome Journade, Tournefeuille (FR); Remi Morin, Beauzelle (FR); Robert Lignee, Tournefeuille (FR)

(73) Assignees: Airbus Operations (SAS), Toulouse (FR); Airbus (SAS), Blagnac (FR)

( * ) Notice: Subject to any disclaimer, the term of this patent is extended or adjusted under 35 U.S.C. 154(b) by 28 days.

(21) Appl. No.: 13/852,906

(22) Filed: Mar. 28, 2013

(65) Prior Publication Data

US 2013/0261920 A1 Oct. 3, 2013

(30) Foreign Application Priority Data

Mar. 30, 2012 (FR) .................................... 12 52921

(51) Int. Cl.
*G06F 7/70* (2006.01)
*B64C 25/42* (2006.01)
*B60T 8/17* (2006.01)

(52) U.S. Cl.
CPC ............. *B64C 25/426* (2013.01); *B60T 8/1703* (2013.01)
USPC .......................................................... 701/70

(58) Field of Classification Search
CPC ................................ B60T 8/1703; B60T 8/172
USPC .......................................................... 701/70
See application file for complete search history.

(56) References Cited

U.S. PATENT DOCUMENTS

| 4,122,522 | A | 10/1978 | Smith |
| 7,797,095 | B2 | 9/2010 | Rado |
| 2008/0030073 | A1 | 2/2008 | Goodman et al. |
| 2009/0292483 | A1* | 11/2009 | Journade et al. ................ 702/33 |
| 2010/0036551 | A1 | 2/2010 | Lacaze et al. |

FOREIGN PATENT DOCUMENTS

| DE | 40 10 507 C1 | 10/1991 |
| DE | 10 2005 046 612 A1 | 4/2007 |
| EP | 1 935 732 A1 | 6/2008 |
| FR | 2 930 669 A1 | 10/2009 |
| GB | 2 243 657 A | 11/1991 |
| WO | 2005/100112 A1 | 10/2005 |
| WO | 2008/127468 A2 | 10/2008 |

OTHER PUBLICATIONS

French Search Report dated Feb. 28, 2012 in FR 1157041.

* cited by examiner

*Primary Examiner* — James Trammell
*Assistant Examiner* — Michael D Lang
(74) *Attorney, Agent, or Firm* — Nixon & Vanderhye P.C.

(57) ABSTRACT

A method to control braking of an aircraft on a landing runway including: selecting a dummy runway state corresponding to a level of adhesion of wheels of the aircraft to a runway which is lower, over an entire speed range of the aircraft while braking on a runway, than an adhesion level of the wheels of the aircraft to the landing runway; calculating a set point of a deceleration value for the aircraft on the landing runway based on the landing runway for the selected dummy runway state, wherein the calculated set point corresponds to maximum braking value of the aircraft, and controlling the braking of the aircraft using the set point.

17 Claims, 4 Drawing Sheets

METHOD AND SYSTEM FOR CONTROLLING AIRCRAFT BRAKING ON A RUNWAY

RELATED APPLICATION

This application claims priority to French Application 12-52921 filed on Mar. 30, 2012, the entirety of which is incorporated by reference.

BACKGROUND

The present invention relates to the field of the landing of aircraft on a landing runway.

The effectiveness of aircraft braking on the landing runway depends on the state of the runway. The state of the landing runway depends on meteorological conditions. Examples of runway states include: dry, wet (rain), snow and ice.

Patent application FR2.930.669 discloses a device onboard an aircraft for identifying the state of a landing runway on which this aircraft is landing.

During trials of a new aircraft, the aircraft's braking performance is generally tested by landing the aircraft on runways under different runway states, such as a "dry runway" and a "wet runway." The tests are used to create models of the aircraft's braking performance for different runway states. The braking performance of the aircraft on runways under other states is customarily estimated on the basis of the models.

It would be helpful to actually measure the braking performance for all possible runway states during actual braking of the aircraft. It is generally easy to find a landing runway corresponding to a "dry runway" state, and even a wet runway state to measure actual braking performance. To actually measure braking performance on runways under other states, such as snow or ice, it would require taking the aircraft to a geographical location at which the meteorological conditions allow the presence of snow or ice.

To measure braking performance on all runway states would be expensive and time consuming, especially as compared to measuring braking performance on only dry and wet runway states. Moreover, one cannot be certain that the state of the runway would be homogeneous over the whole of the length of the landing runway. Neither would one be certain that the actual state of the runway would correspond to the conditions of the lowest possible adhesion of the wheels of the aircraft to the runway for all runway states.

SUMMARY OF THE INVENTION

To remedy the aforementioned drawbacks of having to measure braking performance on different runway states, a method has been conceived to control or estimate the braking, e.g. distance or deceleration, of an aircraft on a landing runway. The landing runway being in a state termed the "current runway state" during the braking of the aircraft.

The method includes the following successive steps: a) selection of a dummy runway state, from stored data on runway states, for which the adhesion of the wheels of the aircraft to the landing runway is lower, over the whole of the speed range of the aircraft during this braking, than the adhesion of the wheels of the aircraft to the landing runway corresponding to the current runway state, with the aid of a means of selection of the aircraft; b) a set point of deceleration of the aircraft on the landing runway, corresponding to maximum braking of the aircraft, is computed with the aid of a means of computation of deceleration of the aircraft by considering the landing runway in the selected dummy runway state; and c) a braking system of the aircraft is controlled to obtain an actual deceleration of the aircraft corresponding to the deceleration set point computed in step b) for the current runway state.

A method has been conceived for controlling or estimating the braking of an aircraft on a landing runway, according to which the following successive steps are carried out: a) a dummy runway state for which the adhesion of the wheels of the aircraft to the landing runway is lower than that corresponding to the current runway state is selected; b) a set point of deceleration of the aircraft on the landing runway, corresponding to maximum braking of the aircraft, is computed by considering the landing runway in this dummy runway state; and c) a braking system of the aircraft is controlled so as to obtain an actual deceleration of the aircraft corresponding to the deceleration set point.

The method, as one of its advantages, allows the simulation of the braking of the aircraft on a landing runway having a runway state for which the adhesion of the wheels of the aircraft to the landing runway is lower than the adhesion of the wheels of the aircraft to the landing runway actually used. It is thus possible to verify what the behaviour of the aircraft and of some of its systems would be on a landing runway whose state corresponds to the selected dummy runway state. Thus, by using one and the same landing runway having a current state corresponding to the highest adhesion of the wheels of the aircraft to the runway ("dry runway" state), it is possible to simulate the landing of the aircraft on a landing runway having any runway state (wet runway, presence of snow or ice, etc.). This avoids having to take the aircraft to another geographical location to carry out the desired braking trials, thereby saving time and cost.

In step b), the deceleration set point may be computed as a function of at least one aerodynamic force exerted on the aircraft, of the thrust of the engines of the aircraft and of the braking force exerted by braking means of the aircraft.

In particular, it is possible to compute the deceleration set point during braking using the following formula:
in which:

$$Decel = \frac{Pm - \text{Drag} - Fb}{M}$$

Decel is the deceleration set point;
Pm is the thrust of the engines of the aircraft;
Drag is the aerodynamic drag of the aircraft;
Fb is the braking force exerted by the braking system on the aircraft;
M is the mass of the aircraft.

In a particular embodiment, the at least one aerodynamic force exerted on the aircraft is computed using at least one of the following formulae:

Lift=0.7×$Ps$×Sref×Mach$^2$×$Cz$

Drag=0.7×$Ps$×Sref×Mach$^2$×$Cx$ in which:
Ps is the static pressure of the air;
Mach is the Mach number of the aircraft;
Sref is the reference area (area of the wings of the aircraft);
Cx is the drag coefficient;
Cz is the lift coefficient.

In a variant to this particular embodiment, the at least one aerodynamic force exerted on the aircraft is computed using at least one of the following formulae:

$$\text{Lift} = \tfrac{1}{2} \times \rho \times \text{Sref} \times V^2 \times Cz$$

$$\text{Drag} = \tfrac{1}{2} \times \rho \times \text{Sref} \times V^2 \times Cx$$

in which:

ρ is the density of the air;
V is the speed of the aircraft with respect to the air;
Sref is the reference area (area of the wings of the aircraft);
Cx is the drag coefficient;
Cz is the lift coefficient.

The braking force Fb may be computed as a function of the load applied to the main undercarriages of the aircraft and of a coefficient of friction of the wheels of the aircraft on the runway corresponding to the selected dummy runway state. It can advantageously be computed using the following formula:

$$Fb = MG\text{load} \times \mu$$

in which:

MGload is the load applied to the main undercarriages of the aircraft;
μ is the coefficient of friction of the wheels of the aircraft on the runway.

In a first embodiment, the load applied to the main undercarriages of the aircraft is computed as a function at least of the mass of the aircraft, of an aerodynamic force exerted on the aircraft and of the load applied to the front undercarriage of the aircraft. It can advantageously be computed using the following formula:

$$MG\text{load} = M \times g - \text{Lift} - NG\text{load}$$

in which:

M is the mass of the aircraft;
g is the acceleration due to gravity;
Lift is the aerodynamic lift of the aircraft;
NGload is the load applied to the front undercarriage of the aircraft.

In a second embodiment, the load applied to the main undercarriages of the aircraft is measured by means of at least one sensor installed aboard the aircraft which senses the load (force) applied to the main undercarriages.

In another embodiment, steps b) and c) are repeated in an iterative manner during the braking of the aircraft. This makes it possible to slave the actual braking of the aircraft to a deceleration set point computed in real time during at least one part of the aircraft braking phase, so as to simulate braking on a landing runway whose state corresponds to the dummy runway state selected in step a).

The method may be applied assist an aircraft in braking on a landing runway, this landing runway being in a state termed "current runway state" during the braking of the aircraft. This aircraft is noteworthy in that it comprises:

a selection means, e.g., a software unit, making it possible to select a dummy runway state for which the adhesion of the wheels of the aircraft to the landing runway is lower, over the whole of the speed range of the aircraft during this braking, than the adhesion of the wheels of the aircraft to the landing runway corresponding to the current runway state;

a first communication means, connected to the selection means and able to transmit the value of a dummy runway state selected by virtue of the selection means;

a computation means, e.g., another software unit, connected to the first communication means and able to receive the value of the dummy runway state selected by virtue of the selection means, these computation means being able to compute a set point of deceleration of the aircraft on the landing runway, corresponding to maximum braking of the aircraft, by considering the landing runway in the previously selected dummy runway state;

a second communication means, connected to the computation means and able to transmit the deceleration set point;

a braking system, connected to the second communication means, able to receive the set point of deceleration of the aircraft and to control the braking of the aircraft so as to obtain an actual deceleration of the aircraft corresponding to the deceleration set point.

DESCRIPTION OF THE DRAWINGS

The invention will be better understood on reading the description which follows and on examining the appended figures.

DETAILED DESCRIPTION

Figure 1:
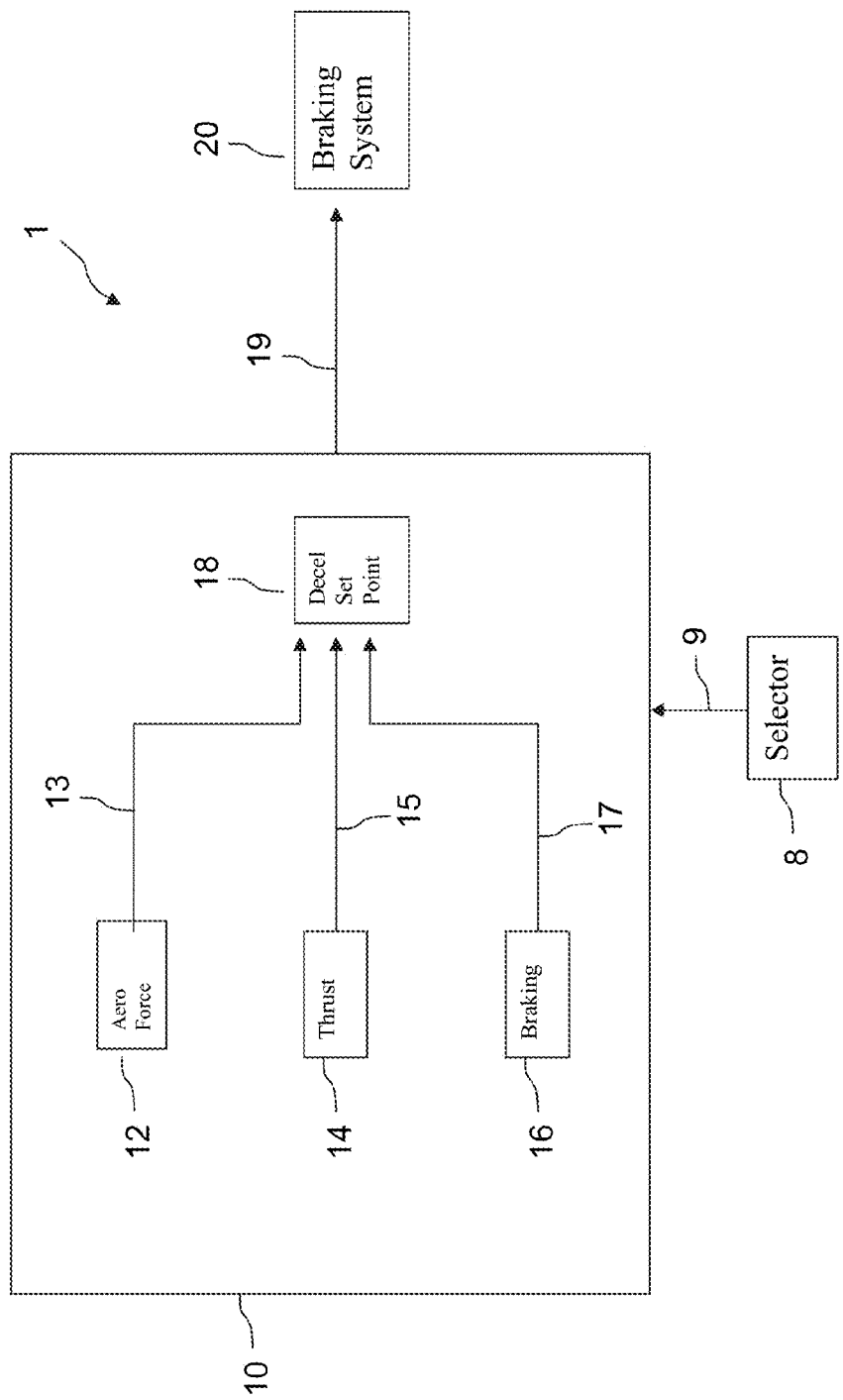
FIGS. 1 and 2 represent, as a schematic diagram, two variants of a device for control of the braking in an aircraft, in accordance with the invention.

FIG. 1 illustrates a computer system 1 for controlling the braking of an aircraft. The system 1 may be an aircraft onboard system and in communication with and potentially control a braking system 20 of an aircraft. The device may include a deceleration computation means 10, and selection means 8 allowing a pilot or a crew member to select a dummy runway state for which he desires to simulate braking of the aircraft. These selection means is connected by a communications link 9 to the deceleration computation means 10.

When a pilot selects a dummy runway state by virtue of the selection means 8, the selected dummy runway sate is transmitted to the deceleration computation means 10, through the communications link 9. The deceleration computation means 10 may comprise a first means 12 for computing at least one aerodynamic force applied to the aircraft, a second means 14 for computing the thrust of the engines of the aircraft, a third means 16 for computing the braking force exerted by braking means of the aircraft and a fourth means 18 for computing a deceleration set point. The first to third means 12, 14 and 16 are connected by respective communications links 13, 15 and 17 to the fourth means 18.

The deceleration computation means 10, selection means 8, communications link 9, and the first through fourth means 12, 14, 16 and 18, and means 22 for computing the load MGload may be embodied as hardware logic units or software program modules in the aircraft onboard computer system 1. For example, the computer system may include a processor(s) and a non-transitory storage unit(s) storing information of various selectable dummy runway states and instructions to be executed by the processor(s) to perform the functions for each of the deceleration computation means 10, selection means 8, communications link 9, and the first through fourth means 12, 14, 16 and 18.

The forth means 18 computes a set point of deceleration of the aircraft as a function of:

the at least one aerodynamic force applied to the aircraft, computed by the first means 12 (whose value is received by the fourth means 18 by means of the communication link 13);

the thrust of the engines of the aircraft, computed by the second means 14 (whose value is received by the fourth means 18 by means of the communications link 15); and the braking force, computed by the third means 16 (whose value is received by the fourth means 18 by means of the communications link 17).

In particular, the at least one aerodynamic force computed by the first means 12 corresponds to the aerodynamic drag of the aircraft and the fourth means 18 compute the deceleration set point during braking using the following formula:

$$Decel = \frac{Pm - \text{Drag} - Fb}{M}$$

in which:
Decel is the deceleration set point;
Pm is the thrust of the engines of the aircraft;
Drag is the aerodynamic drag of the aircraft;
Fb is the braking force exerted by the braking means;
M is the mass of the aircraft.

According to a first variant, the first means 12 compute the aerodynamic drag exerted on the aircraft using the following formula:

$$\text{Drag} = 0.7 \times Ps \times Sref \times \text{Mach}^2 \times Cx$$

in which:
Ps is the static pressure of the air;
Mach is the Mach number of the aircraft;
Sref is the reference area (area of the wings of the aircraft);
Cx is the drag coefficient.

In a second variant, the first means 12 compute the aerodynamic drag exerted on the aircraft using the following formula:

$$\text{Drag} = \tfrac{1}{2} \times \rho \times Sref \times V^2 \times Cx$$

in which:
$\rho$ is the density of the air;
V is the speed of the aircraft with respect to the air;
Sref is the reference area (area of the wings of the aircraft);
Cx is the drag coefficient.

The third means 16 may compute the braking force Fb as a function of the load applied to the main undercarriages of the aircraft and of a coefficient of friction of the wheels of the aircraft on the runway corresponding to the selected dummy runway state. In an advantageous manner, the third means 16 compute the braking force Fb using the following formula:

$$Fb = M\text{Gload} \times \mu$$

in which:
MGload is the load applied to the main undercarriages of the aircraft;
$\mu$ is the coefficient of friction of the wheels of the aircraft on the runway.

The coefficient $\mu$ is notably dependent on the selected runway state for which it is desired to simulate a braking of the aircraft, as well as the speed of the aircraft with respect to the ground. It corresponds to the friction of the wheels on the landing runway for maximum braking of the aircraft.

Figure 3:
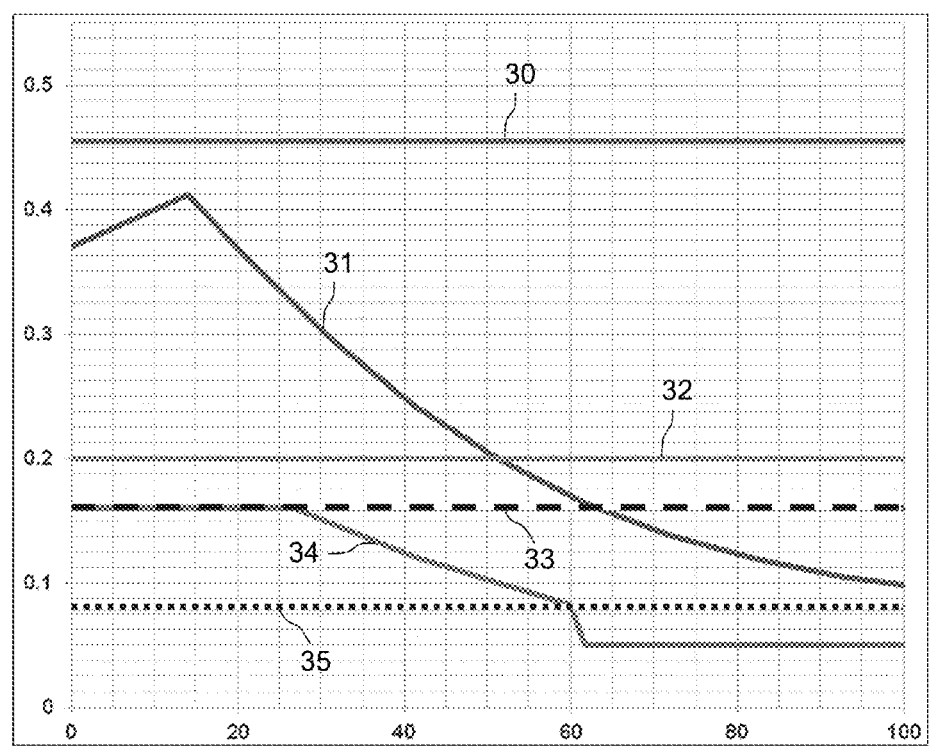
FIG. 3 represents the coefficient of friction of the wheels of an aircraft on a landing runway as a function of speed, for various states of the landing runway.

FIG. 3 represents the variation of the coefficient of friction $\mu$ as a function of speed for various runway states. In this figure, the vertical scale represents the value of the coefficient $\mu$ (dimensionless) and the horizontal scale represents the value of the speed of the aircraft with respect to the ground in meters per second. The curves 30 to 35 represent the evolution of the coefficients $\mu$ of friction as a function of speed respectively for the following dummy runway states:
dry runway (30);
wet runway (31);
presence of compacted snow on the runway (32);
presence of dry or wet snow on the runway (33);
presence of a thickness of water on the runway (34);
presence of ice on the runway (35).

The third means 16 for computing the braking force may comprise a table of the values of the coefficient $\mu$ as a function of speed for the various runway states considered. For the computation of the braking force Fb, the fourth means 16 use the tabulated values of the coefficient $\mu$.

Figure 2:
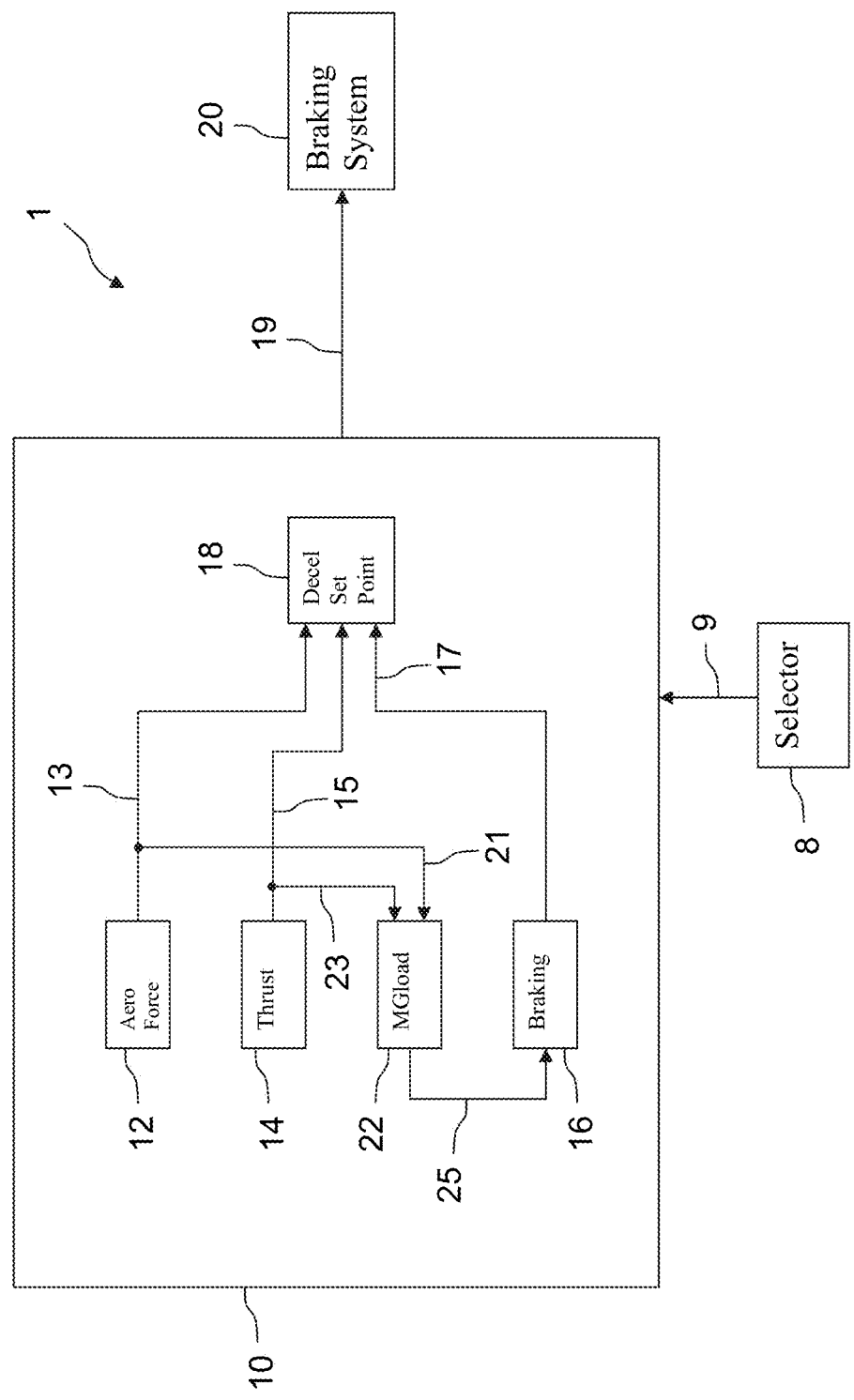

As regards the determination of the load MGload applied to the main undercarriages of an aircraft, in a first variant embodiment represented in FIG. 2, the deceleration computation means 10 furthermore comprise a means 22 for computing the load MGload applied to the main undercarriages. The means 22 are connected to the first means 12 for computing at least one aerodynamic force applied to the aircraft, by a communications link 21. The first means 12 furthermore compute the aerodynamic lift exerted on the aircraft and transmit the value of the lift to the means 22 through the link 21. The means 22 compute the load MGload applied to the main undercarriages of the aircraft as a function at least of the mass of the aircraft, of the aerodynamic lift exerted on the aircraft and of the load applied to the front undercarriage of the aircraft. It can advantageously be computed using the following formula:

$$M\text{Gload} = M \times g - \text{Lift} - N\text{Gload}$$

in which:
M is the mass of the aircraft;
g is the acceleration due to gravity;
Lift is the aerodynamic lift of the aircraft;
NGload is the load applied to the front undercarriage of the aircraft.

The lift can be computed by the means 12 using the following formula:

$$\text{Lift} = 0.7 \times Ps \times Sref \times \text{Mach}^2 \times Cz$$

in which:
Ps is the static pressure of the air;
Mach is the Mach number of the aircraft;
Sref is the reference area (area of the wings of the aircraft);
Cz is the lift coefficient.

Alternatively, the fourth means 12 can also use the following formula to compute the lift:

$$\text{Lift} = \tfrac{1}{2} \times \rho \times Sref \times V^2 \times Cz$$

in which:
$\rho$ is the density of the air;
V is the speed of the aircraft with respect to the air;
Sref is the reference area (area of the wings of the aircraft);
Cz is the lift coefficient.

The means 22 are connected by a link 25 to the means 16 for computing the braking force. They transmit the computed value of the load MGload applied to the main undercarriages of the aircraft to the means 16 through the link 25.

In a second variant embodiment, the load MGload applied to the main undercarriages of the aircraft is measured by means of at least one sensor installed aboard the aircraft.

The load NGload applied to the front undercarriage of the aircraft and used in the formula corresponding to the first variant hereinabove can be either measured by means of at least one sensor installed aboard the aircraft, or computed using a model of the aircraft. This model, which is particular to the type of aircraft considered, can notably be dependent on the thrust of the engines, the drag, the lift, the position of the centre of gravity of the aircraft, the mass of the aircraft, or the acceleration or the deceleration of the aircraft. This model is preferably implemented in the means 22. The value of the thrust used in this model is determined by the means 14 for computing the thrust and transmitted by a link 23 to the means 22 for computing the load MGload.

The means 14 for computing the thrust of the engines of the aircraft compute the thrust by using information received from the computers for managing the engines, for example of FADEC (Full Authority Digital Engine Control) type or of EEC (Electronic Engine Control) type.

By way of example, the thrust Pmi of an engine number i of the aircraft under steady conditions can be computed according to the following equation when the thrust lever corresponding to this engine in the cockpit is in a position other than "IDLE" (engine idling):

$$Pmi = k2 \times N1^2 + k1 \times N1 + k0$$

in which:
k0, k1, k2 are coefficients;
N1 is the rotation speed of the low-pressure compressor turbine of the engine.

When the thrust lever corresponding to engine number i in the cockpit of the aircraft is in a position forming part of a range of positions "IDLE" (engine idling), the thrust of engine number i of the aircraft under steady conditions can be computed through the following formula:

$$Pmi = (a3 \times \text{Mach}^3 + a2 \times \text{Mach}^2 + a1 \times \text{Mach} + a0) \times \cos(\alpha)$$

in which:
a0, a1, a2, a3 are coefficients dependent on the position of the engine thrust lever;
Mach is the mach number of the aircraft;
$\alpha$ is the angle of attack of the aircraft.

Outside of the aforementioned phases of steady conditions, that is to say during transient phases between an initial thrust of an engine, corresponding to an initial position of the lever associated with this engine, and a final thrust, corresponding to a final position of the lever associated with this engine, the thrust of the engine varies progressively from the initial thrust up to the final thrust. The final thrust is generally attained only after a delay time in accordance with the positioning of the thrust lever in the final position. This delay time is notably dependent on the engine's reaction time.

The thrust (Pm) of the engines of the aircraft is equal to the sum of the thrusts (Pmi) of the various engines of the aircraft, for (i) varying from 1 to N, N being the number of engines of the aircraft:

$$Pm = Pm1 + Pm2 + \ldots + PmN$$

The deceleration set point computed by the means 18 is computed in an iterative manner during the braking phase of the aircraft on the landing runway. The deceleration computation means 10 are connected by a communication link 19, forming part of second communication means, to a braking system 20 of the aircraft. The first communication means and the second communication means can either be distinct means, or form part of one and the same set of communication means, such as for example a communication network onboard the aircraft. The braking system 20 can notably be of the BCS (Brake Control System) type. The deceleration set point computed by the means 18 is transmitted, via this link 19, to the braking system 20 of the aircraft. This braking system controls braking means of the aircraft by slaving the braking of the aircraft so as to comply with this set point.

Figure 4:
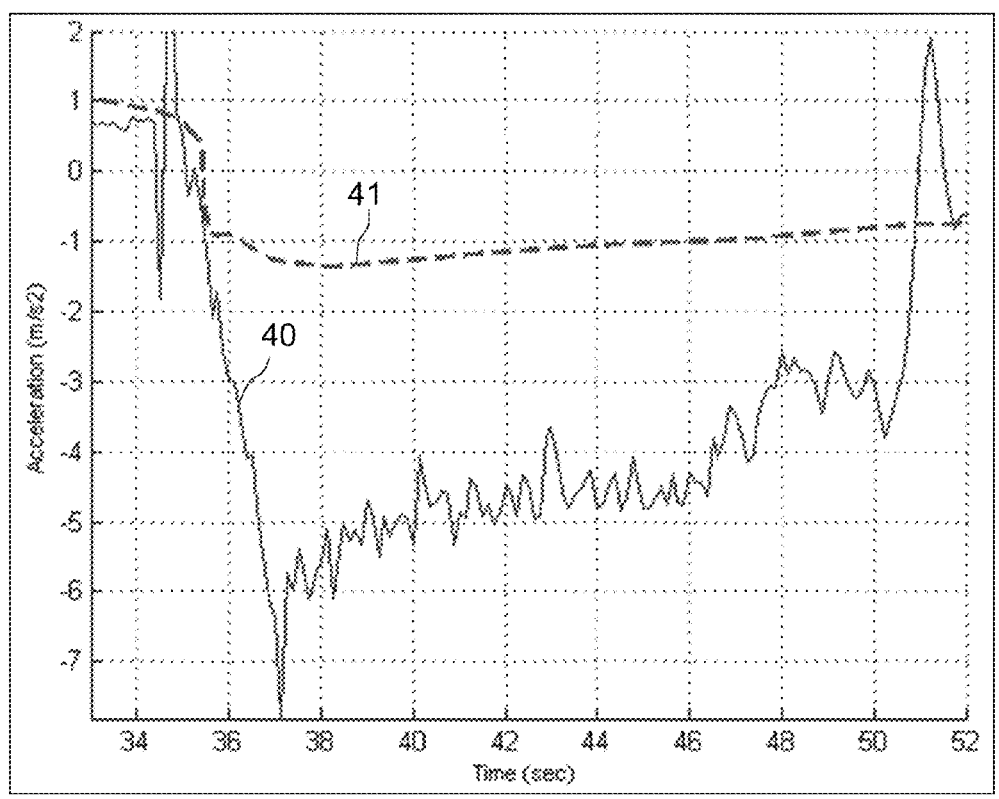
FIG. 4 is a representation of the deceleration of the aircraft on the landing runway on the one hand for the current runway state and for a dummy runway state.

FIG. 4 represents the value of the deceleration of the aircraft as a function of time. The vertical scale represents the acceleration of the aircraft in m/s². The deceleration therefore corresponds to negative values on this scale. The horizontal scale represents the time in seconds. The solid curve 40 represents the deceleration of an aircraft on a dry runway. The dashed curve 41 represents the deceleration of the same aircraft, on the same dry runway, using the method of controlling braking according to the invention to simulate braking on a landing runway on which ice is present. Given that the coefficient $\mu$ of friction of the wheels corresponding to a runway on which ice is present is much lower than the coefficient of friction of the wheels corresponding to a dry runway, the simulated deceleration of the aircraft on an icy runway, represented by the curve 41, is much lower than the deceleration corresponding to the dry runway, represented by the curve 40.

The dummy runway state selected by the pilot to correspond to an adhesion of the wheels of the aircraft to the landing runway is to be lower, over the whole of the speed range of the aircraft during this braking, than the adhesion of the wheels of the aircraft to the landing runway corresponding to the current runway state during braking. The selection of the dummy runway state may include selecting from a group of dummy runway states the dummy runway state having a level of adhesion most similar to but no greater than the adhesion level of the wheels of the aircraft to the landing runway at the current runway state.

This level of adhesion between the wheels and runway may be expressed by a coefficient of friction of the wheels $\mu$, corresponding to the dummy runway state, that is lower over the whole of the speed range of the aircraft during braking, than the coefficient of friction of the wheels $\mu$, corresponding to the current runway state during braking.

The selection of the dummy runway state may be made by the pilot. However, in an advantageous embodiment, the selection means 8 checks this condition and allows the pilot to only select an appropriate dummy runway state, such as a coefficient of friction of the wheels lower than the coefficient of friction of landing runway. For example, the selection means may only present for selection by the pilot dummy runway states corresponding to a level of adhesion, e.g., coefficient of friction, no greater than the level of adhesion of the landing runway at the current runway state.

To allow for the selection of a dummy runway state, the value of the current runway state should be available to the pilots aboard the aircraft or to the selection means, such as by storing the current runway state to be accessed directly by the selection means 8, or in an onboard system capable of communicating this value to the selection means 8. The value of the current runway state may be input by an operator of the aircraft, for example a pilot, by means of a man machine interface of the aircraft. Alternatively, this value of the current runway state may originate from an air traffic control centre or another aircraft and be received in an automatic manner by an onboard system of the aircraft. The selection of the dummy runway state by the pilot is carried out preferably before the landing of the aircraft on the runway, for example during a phase of approaching the landing runway.

From an operational point of view, a dry runway may be set as the only or one of the dummy runway states. With a dry runway, the friction coefficient $\mu$ is always greater than the values of friction coefficient corresponding to all other runway states, including all other current runway states. Using a dry runway as a dummy runway state, it is possible to simulate braking on a landing runway corresponding to any runway state.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method to control braking of an aircraft on a landing runway comprising:
    storing data regarding dummy runway states wherein the data for each dummy runway state correlates an adhesion level of wheels of the aircraft to landing speeds of the aircraft for a specific weather condition;
    selecting one of the dummy runway states which corresponds to a level of adhesion of wheels of the aircraft to a runway which is no greater, over an entire speed range of the aircraft while braking on the runway, than an adhesion level of the wheels of the aircraft to the landing runway at a current weather condition;
    calculating a set point of a deceleration value for the aircraft on the landing runway based on data indicating braking of the aircraft on the landing runway at a weather condition different from the current weather condition and the stored data for the selected one of the dummy runway states, wherein the calculated set point corresponds to maximum braking value of the aircraft, and
    controlling the braking of the aircraft using the set point while the aircraft lands on the landing runway during the current weather condition.

2. The method according to claim 1 wherein the calculation of the set point includes applying a function having as a parameter at least one of an aerodynamic drag force exerted on the aircraft, a thrust of the aircraft, and a braking force exerted on the aircraft.

3. The method according to claim 2 wherein the calculation of the set point includes applying the following formula:

$$Decel = \frac{Pm - \text{Drag} - Fb}{M}$$

in which:
    Decel is the set point;
    Pm is the thrust of the aircraft;
    Drag is the aerodynamic drag force;
    Fb is the braking force;
    M is a mass of the aircraft.

4. The method of according to claim 1 wherein the calculation of the set point includes applying a function that correlates a braking force to a load applied to a main undercarriage of the aircraft, and the level of adhesion corresponds to a coefficient of friction between the wheels of the aircraft and a runway corresponding to the selected dummy runway state.

5. The method of controlling braking according to claim 4 wherein the load applied to the main undercarriages of the aircraft is calculated as a function of the mass of the aircraft, an aerodynamic force exerted on the aircraft and a load applied to a front undercarriage of the aircraft.

6. The method of controlling braking according to claim 4 wherein the load on the main undercarriages of the aircraft is determined using information collected from at least one sensor aboard the aircraft which senses a force applied to the main undercarriages.

7. The method of controlling braking according to claim 1 wherein the calculation of the set point and control of the braking are repeated in an iterative manner during the braking of the aircraft.

8. The method of controlling braking according to claim 1 wherein the selected one of the dummy runway states has a level of adhesion most similar to and no greater than the adhesion level of the wheels of the aircraft to the landing runway.

9. The method of claim 1 wherein the storage of dummy runway states includes storing the dummy runway states before takeoff of the aircraft.

10. A method to control braking of an aircraft on a landing runway comprising:
    selecting a dummy runway state corresponding to a level of adhesion of wheels of the aircraft to a runway which is lower, over an entire speed range of the aircraft while braking on a runway, than an adhesion level of the wheels of the aircraft to the landing runway;
    calculating a set point of a deceleration value for the aircraft on the landing runway based on the landing runway for the selected dummy runway state, wherein the calculated set point corresponds to maximum braking value of the aircraft, and wherein the calculation of the set point includes calculating an aerodynamic force exerted on the aircraft using at least one of the following formulae:

$$\text{Lift} = 0.7 \times Ps \times Sref \times \text{Mach}^2 \times Cz$$

$$\text{Drag} = 0.7 \times Ps \times Sref \times \text{Mach}^2 \times Cx$$

in which:
    Ps is static air pressure;
    Mach is a Mach number of a speed of the aircraft;
    Sref is a reference surface area of the aircraft;
    Cx is a drag coefficient, and
    Cz is a lift coefficient, and
    controlling the braking of the aircraft using the set point.

11. A method to control braking of an aircraft on a landing runway comprising:
    selecting a dummy runway state corresponding to a level of adhesion of wheels of the aircraft to a runway which is lower, over an entire speed range of the aircraft while braking on a runway, than an adhesion level of the wheels of the aircraft to the landing runway;
    calculating a set point of a deceleration value for the aircraft on the landing runway based on the landing runway for the selected dummy runway state, wherein the calculated set point corresponds to maximum braking value of the aircraft, and wherein the calculation of the set point includes a calculation of an aerodynamic force exerted on the aircraft using at least one of the following formulae:

$$\text{Lift} = \frac{1}{2} \times \rho \times Sref \times V^2 \times Cz$$

$$\text{Drag} = \frac{1}{2} \times \rho \times Sref \times V^2 \times Cx$$

in which:
    ρ is air density;
    V is a speed of the aircraft;
    Sref is a reference surface area of the aircraft;
    Cx is a drag coefficient, and
    Cz is the lift coefficient, and
    controlling the braking of the aircraft using the set point.

12. A method for determining a set point for braking an aircraft on a landing runway, the method comprising:
    storing data regarding dummy runway states, wherein the data for each dummy runway state includes information regarding a level of adhesion between a wheel and a runway during a specific weather condition and wherein weather condition differs for each of the dummy runway states;

receiving information regarding a current runway state of a landing runway on which the aircraft is landing;

selecting one of the stored dummy runway states or receiving information regarding a selected one of the dummy runway states, wherein the selected one of the stored dummy runway states corresponds to a level of adhesion no greater than a level of adhesion between a wheel of the aircraft and the landing runway for all braking speeds of the aircraft on the landing runway at the current runway state;

calculating a set point for deceleration of the aircraft on the of a deceleration value for the aircraft on the landing runway based on the stored data of the selected one of the stored dummy runway states and information regarding deceleration of the aircraft on the landing runway during a runway state different than the current runway state, and braking the aircraft on the landing runway during the current runway state using the calculated set point.

13. The method of controlling braking according to claim 12 wherein the selection of the dummy runway state includes selecting from a group of dummy runway states the dummy runway state having a level of adhesion most similar to and lower than the adhesion level of the wheels of the aircraft to the landing runway.

14. A computer system associated with an aircraft having wheels and a braking system to decelerate the aircraft, the computer system including a processor and a non-transitory memory storing instructions which are executed by the processor and causes the computer system to:

access information regarding dummy runway states, wherein the dummy runway states each represent a level of adhesion between a wheel and a runway during a certain weather condition, and each runway state corresponds to a different weather condition;

select the dummy runway from the dummy runway states that corresponds to a level of adhesion no greater than an adhesion between a wheel of the aircraft and the landing runway at the current weather condition for all braking speeds of the aircraft on the landing runway at a current weather condition;

calculate a maximum braking force to be applied to the aircraft using the selected dummy runway state and on information regarding the braking of the aircraft on the landing runway during a weather condition other than the current weather condition;

decelerating the aircraft on the landing runway during the current weather condition, wherein the deceleration is limited to the maximum braking force.

15. The computer system of claim 14 wherein the selection includes selecting the dummy runway state corresponding to a level of adhesion most similar to and no greater than the adhesion level of the wheels of the aircraft to the landing runway at the current weather condition.

16. The computer system of claim 15 wherein the selection includes receiving an input from a human identifying the selected dummy runway state.

17. The computer system of claim 16 wherein the selection includes presenting to the human for selection information only on the dummy runway states having a level of adhesion no greater than the adhesion level of the wheels of the aircraft to the landing runway at the current weather condition.

* * * * *